United States Patent
Moriyasu (10) Patent No.: US 12,471,857 B2
(45) Date of Patent: Nov. 18, 2025

(54) PET APPARATUS, METHOD, AND STORAGE MEDIUM

(71) Applicant: CANON MEDICAL SYSTEMS CORPORATION, Tochigi (JP)

(72) Inventor: Kenta Moriyasu, Nasushiobara (JP)

(73) Assignee: CANON MEDICAL SYSTEMS CORPORATION, Tochigi (JP)

(*) Notice: Subject to any disclaimer, the term of this patent is extended or adjusted under 35 U.S.C. 154(b) by 77 days.

(21) Appl. No.: 18/482,347

(22) Filed: Oct. 6, 2023

(65) Prior Publication Data

US 2024/0115220 A1  Apr. 11, 2024

(30) Foreign Application Priority Data

Oct. 6, 2022 (JP) ................. 2022-161728

(51) Int. Cl.
*A61B 6/03* (2006.01)
*A61B 6/42* (2024.01)

(52) U.S. Cl.
CPC .......... *A61B 6/037* (2013.01); *A61B 6/4208* (2013.01)

(58) Field of Classification Search
CPC ...... A61B 6/037; A61B 6/4208; A61B 6/5205
See application file for complete search history.

(56) References Cited

U.S. PATENT DOCUMENTS

| | | | |
|---|---|---|---|
| 2011/0309252 A1* | 12/2011 | Moriyasu | A61B 6/037 250/362 |
| 2017/0276811 A1* | 9/2017 | Wang | G01T 1/2985 |
| 2021/0199823 A1 | 7/2021 | Li et al. | |

FOREIGN PATENT DOCUMENTS

JP    2021-110737 A    8/2021

OTHER PUBLICATIONS

Gong et al. 2020 Proc IEEE Inst. Electr. Electron. Eng. 108: 51â68 (Year: 2020).*
Vandenbergh et al. 2016 EJNMMI Physics 3: paper#3 30 pages (Year: 2016).*

* cited by examiner

*Primary Examiner* — Keith M Raymond
*Assistant Examiner* — Patrick M Mehl
(74) *Attorney, Agent, or Firm* — Oblon, McClelland, Maier & Neustadt, L.L.P.

(57) ABSTRACT

A PET apparatus according to one embodiment includes processing circuitry. The processing circuitry acquires list mode data. The processing circuitry reconstructs a PET image based on the list mode data. The processing circuitry identifies first coincidence data that is obtained by coincidence counting by a first detector and a second detector that is different from the first detector from among a plurality of pieces of coincidence data included in the list mode data. The processing circuitry estimates a time lag amount between the first detector and the second detector based on TOF information included in the first coincidence data and the PET image.

16 Claims, 7 Drawing Sheets

| MODULE ID | SCINTILLATOR NUMBER (P) | ENERGY VALUE (E) | DETECTION TIME (T) |
|---|---|---|---|
| D1 | P11 | E11 | T11 |
| | P12 | E12 | T12 |
| | P13 | E13 | T13 |
| | ⋮ | ⋮ | ⋮ |

| MODULE ID | SCINTILLATOR NUMBER (P) | ENERGY VALUE (E) | DETECTION TIME (T) |
|---|---|---|---|
| D2 | P21 | E21 | T21 |
| | P22 | E22 | T22 |
| | P23 | E23 | T23 |
| | ⋮ | ⋮ | ⋮ |

| MODULE ID | SCINTILLATOR NUMBER (P) | ENERGY VALUE (E) | DETECTION TIME (T) |
|---|---|---|---|
| D3 | P31 | E31 | T31 |
| | P32 | E32 | T32 |
| | P33 | E33 | T33 |
| | ⋮ | ⋮ | ⋮ |

| COINCIDENCE No. | SCINTILLATOR NUMBER (P) | ENERGY VALUE (E) | DETECTION TIME (T) | SCINTILLATOR NUMBER (P) | ENERGY VALUE (E) | DETECTION TIME (T) |
|---|---|---|---|---|---|---|
| 1 | P11 | E11 | T11 | P22 | E22 | T22 |
| 2 | P12 | E12 | T12 | P32 | E32 | T32 |
| 3 | P13 | E13 | T13 | P33 | E33 | T33 |
| ... | ... | ... | ... | ... | ... | ... |

FIG.3

RAW DATA REGION                    IMAGE DATA REGION

PET APPARATUS, METHOD, AND STORAGE MEDIUM

CROSS-REFERENCE TO RELATED APPLICATIONS

This application is based upon and claims the benefit of priority from Japanese Patent Application No. 2022-161728, filed on Oct. 6, 2022; the entire contents of which are incorporated herein by reference.

FIELD

Embodiments described herein relate generally to a PET apparatus, a method, and a storage medium.

BACKGROUND

In recent years, in a Time-of-Flight (TOF)-Positron Emission computed Tomography (PET) apparatus, TOF resolution is improved and it becomes possible to perform reconstruction using TOF information with improved accuracy.

Here, to accurately perform reconstruction using the TOF information, time calibration (hereinafter, TOF calibration) of a detector is needed, and, for example, a method using an external radiation source is generally used as a method for the TOF calibration. As one example, a serviceman identifies a detection time lag in the detector by using an external radiation source, and adjusts time information on the corresponding detector based on the identified lag.

DETAILED DESCRIPTION

A PET apparatus according to an embodiment includes processing circuitry. The processing circuitry is configured to acquire list mode data. The processing circuitry is configured to reconstruct a PET image based on the list mode data. The processing circuitry is configured to identify first coincidence data that is obtained by coincidence counting by a first detector and a second detector that is different from the first detector from among a plurality of pieces of coincidence data included in the list mode data. The processing circuitry is configured to estimate a time lag amount between the first detector and the second detector based on TOF information included in the first coincidence data and the PET image.

Embodiments of a PET apparatus, a method, and a storage medium will be described in detail below with reference to the drawings. Meanwhile, the PET apparatus, the method, and the storage medium according to the present application are not limited by the embodiments described below.

First Embodiment

Figure 1:
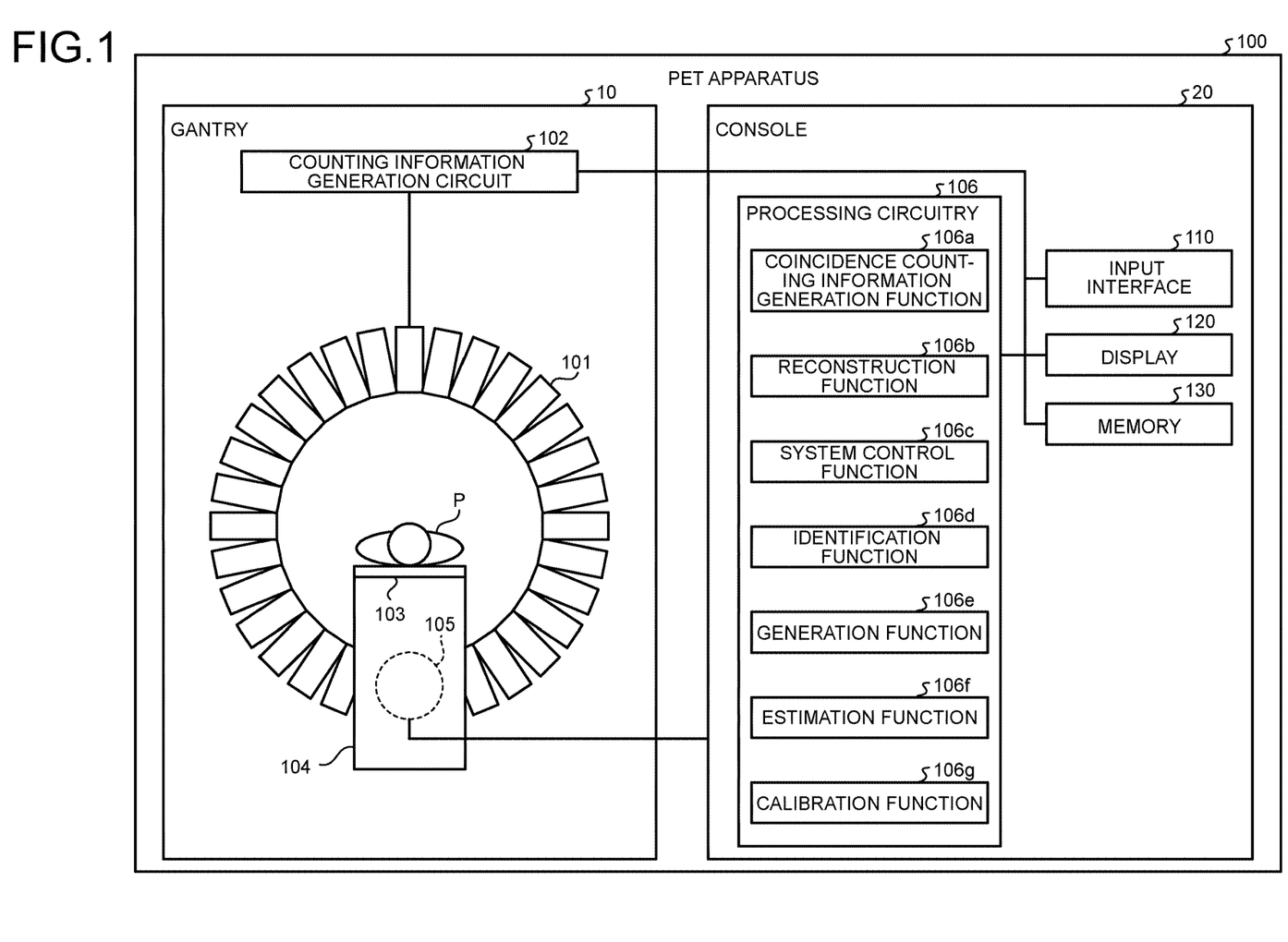
FIG. 1 is a block diagram illustrating an example of a configuration of a PET apparatus according to a first embodiment.

FIG. 1 is a block diagram illustrating an example of a configuration of a PET apparatus 100 according to a first embodiment. As illustrated in FIG. 1, the PET apparatus 100 according to the first embodiment includes a gantry 10 and a console 20.

The gantry 10 includes a PET detector 101, a counting information generation circuit 102, a tabletop 103, a table 104, and a table driving unit 105, detects a gamma ray that is emitted from living tissue in which positron-emitting radionuclide that is given to a subject P is captured, and generates counting information for reconstructing a PET image.

The PET detector 101 includes a plurality of detector modules. The plurality of detector modules detect scintillation light (fluorescence), which is re-emitted when a substance that has entered an excited state due to interaction between a pair annihilation gamma ray emitted from a positron in the subject P and a luminous body (scintillator) transitions to a ground state again, and therefore detects gamma rays. The plurality of detector modules detect energy information on radiation of the pair annihilation gamma ray that is emitted from the positron in the subject P. The plurality of detector modules are arranged so as to surround the subject P in a ring-shape manner.

The detector module includes, for example, a scintillator array, a light detector array, and a light guide.

The scintillator array includes a plurality of scintillators that are arranged in a two-dimensional manner. The scintillator converts a pair annihilation gamma ray, which is input after being emitted from the positron in the subject P, to scintillation light (scintillation photons, optical photons), and outputs the scintillation light. The scintillator is made of, for example, a scintillator crystal, such as Lanthanum Bromide (LaBr3), Lutetium Yttrium Oxyorthosilicate (LYSO), Lutetium Oxyorthosilicate (LSO), or Lutetium Gadolinium Oxyorthosilicate (LGSO), which is suitable for TOF measurement and energy measurement.

Examples of the scintillator are not limited to the examples as described above. For example, lead compounds, such as Bismuth Germanium Oxide (GBO), lead glass (SiO2+PbO), lead fluoride (PbF2), or PWO (PbWO4), may be used as the scintillator.

The light guide is made of a plastic material with good light transparency, and transmits scintillation light that is output from the scintillator to the light detector. Specifically, the light guide transmits the scintillation light to a Silicon Photomultiplier (SiPM) (to be described later).

The light detector array includes a plurality of light detectors (light detection elements) that are arranged in a two-dimensional manner. As the light detector, for example, a SiPM or the like is used.

The PET detector 101 includes the counting information generation circuit 102 for each of the detector modules.

The counting information generation circuit 102 generates counting information (list mode data) by converting an output signal received from the PET detector 101 to digital data. The counting information includes a detection position, an energy value, and a detection time of the pair annihilation gamma ray. For example, the counting information generation circuit 102 identifies a scintillator number (P) that indicates a position of a scintillator to which the pair annihilation gamma ray is input.

Meanwhile, the counting information generation circuit 102 may adopt various methods as a method for identifying a scintillator position at which the pair annihilation gamma ray is input. For example, if a single scintillator and a single SiPM are associated with each other, the counting information generation circuit 102 may identify a position of the scintillator associated with the SiPM from which output is obtained, as the scintillator position at which the pair annihilation gamma ray is input. Further, for example, the counting information generation circuit 102 may identify the scintillator position at which the pair annihilation gamma ray is input by performing center-of-gravity calculation based on the position of each of the light detectors and intensity of an output signal.

Furthermore, the counting information generation circuit 102 performs integral calculation on intensity of an electrical signal that is output from each of the light detectors, and identifies energy value (E) of the pair annihilation gamma ray that is input to the PET detector 101. Moreover, the counting information generation circuit 102 identifies a detection time (T) at which the PET detector 101 detects the scintillation light due to the pair annihilation gamma ray. Meanwhile, the detection time (T) may be an absolute time or an elapsed time since start of image capturing.

Figure 2A:
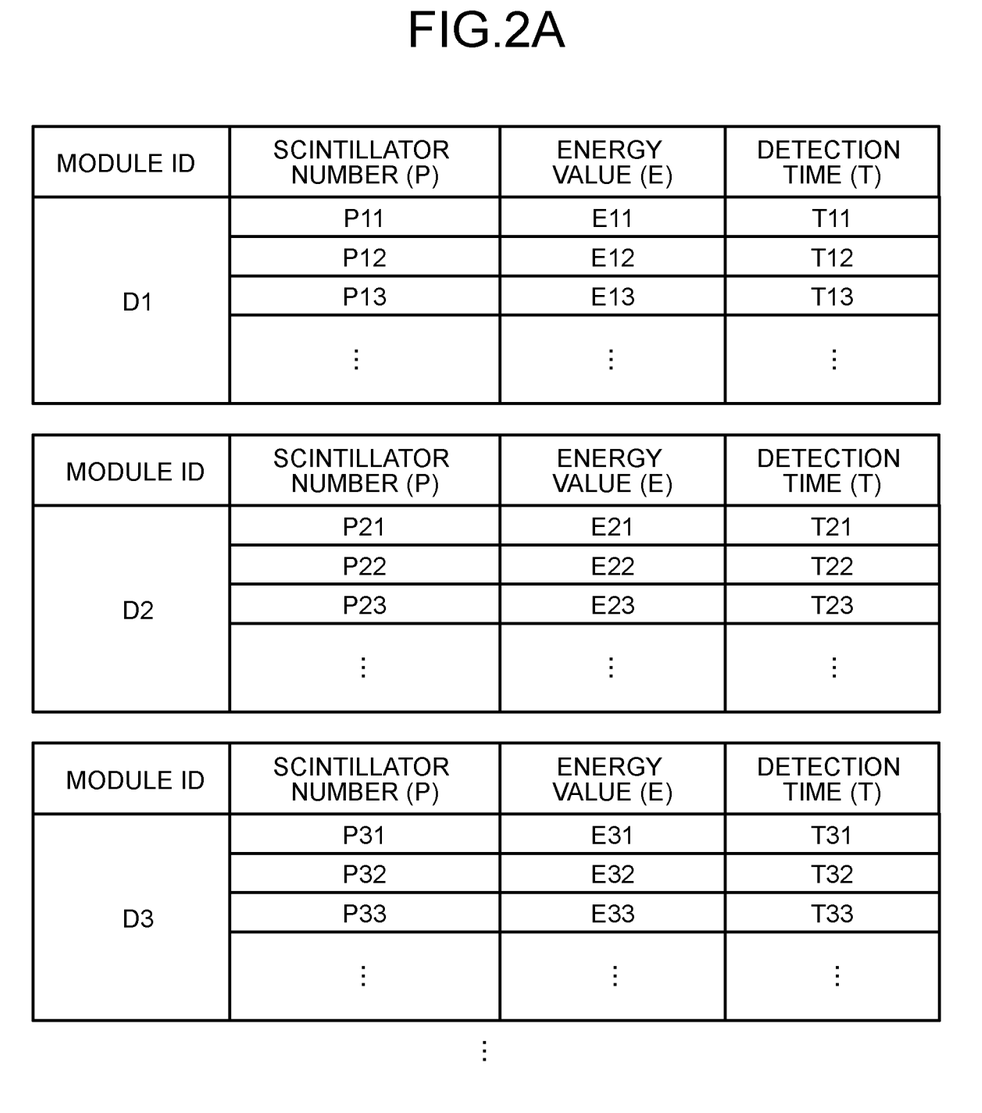
FIG. 2A is a diagram illustrating an example of counting information according to the first embodiment.

As described above, the counting information generation circuit 102 corresponding to each of the detector modules generates the counting information that includes the scintillator number (P), the energy value (E), and the detection time (T). Further, each of the counting information generation circuits 102 stores the generated counting information in a memory 130 of the console 20. FIG. 2A is a diagram illustrating an example of the counting information according to the first embodiment. For example, as illustrated in FIG. 2A, the memory 130 stores therein the scintillator number (P), the energy value (E), and the detection time (T) in association with a module ID for identifying the detector module.

The counting information generation circuit 102 is implemented by, for example, a processor. Further, the counting information generation circuit 102 is one example of an acquisition unit.

Referring back to FIG. 1, the tabletop 103 is a bed on which the subject P is placed, and is arranged on the table 104. The table driving unit 105 moves the tabletop 103 under the control of a system control function 106c of processing circuitry 106. For example, the table driving unit 105 moves the tabletop 103 to move the subject P to an inside of an image capturing opening of the gantry 10.

The console 20 receives operation that is performed by a user on the PET apparatus 100, controls image capturing of a PET image, and reconstructs (generates) a PET image by using counting information collected by the gantry 10. As illustrated in FIG. 1, the console 20 includes the processing circuitry 106, an input interface 110, a display 120, and the memory 130. Meanwhile, the processing circuitry 106, the input interface 110, the display 120, and the memory 130 are connected to one another via a bus.

The processing circuitry 106 executes a coincidence counting information generation function 106a, a reconstruction function 106b, the system control function 106c, an identification function 106d, a generation function 106e, an estimation function 106f, and a calibration function 106g. Each of functions of the coincidence counting information generation function 106a, the reconstruction function 106b, the system control function 106c, the identification function 106d, the generation function 106e, the estimation function 106f, and the calibration function 106g is stored in the memory 130 in the form of a computer-executable program. The processing circuitry 106 is a processor that reads each of the programs from the memory 130, executes each of the read programs, and implements each of the functions corresponding to each of the programs. In other words, the processing circuitry 106 that has read each of the programs has each of the functions illustrated in the processing circuitry 106 in FIG. 1.

Meanwhile, it is explained that, in FIG. 1, the single processing circuitry 106 implements the coincidence counting information generation function 106a, the reconstruction function 106b, the system control function 106c, the identification function 106d, the generation function 106e, the estimation function 106f, and the calibration function 106g. However, the processing circuitry 106 may be configured with a plurality of independent processors, and each of the processors may implement the functions by executing each of the programs.

Meanwhile, the reconstruction function 106b is one example of a reconstruction unit. The identification function 106d is one example of an identification unit. The generation function 106e is one example of a generation unit. The estimation function 106f is one example of an estimation unit. The calibration function 106g is one example of a calibration unit.

The coincidence counting information generation function 106a acquires the counting information that is stored in the memory 130, and generates coincidence counting information (coincidence data) based on the acquired counting information. Further, the coincidence counting information generation function 106a aligns the generated coincidence counting information in an approximately chronological order based on the detection time (T), and stores the coincidence counting information in the memory 130.

Figure 2B:
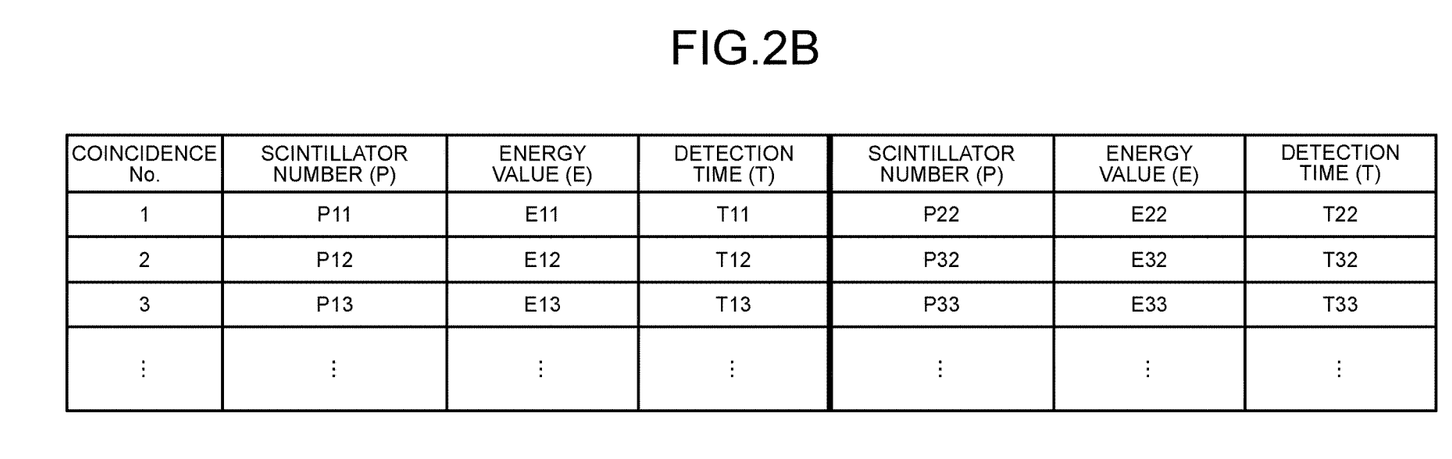
FIG. 2B is a diagram illustrating an example of a chronological list of coincidence counting information according to the first embodiment.

FIG. 2B is a diagram illustrating an example of a chronological list of the coincidence counting information according to the first embodiment. As illustrated in FIG. 2B, the memory 130 stores therein a set of counting information in association with a "coincidence No." that is a serial number of the coincidence counting information. Meanwhile, in the first embodiment, the chronological list of the coincidence counting information is formed such that the information is arranged in an approximately chronological order based on the detection time (T) of the counting information. Further, in the following, in the set of the counting information, a time difference in the detection time (T) will be described as TOF information.

The reconstruction function 106b reconstructs a PET image (reconstructed image). Specifically, the reconstruction function 106b reconstructs the PET image based on the list mode data. For example, the reconstruction function 106b acquires the chronological list of the coincidence counting information stored in the memory 130, and reconstructs the PET image by using the acquired chronological list of the coincidence counting information. Further, the reconstruction function 106b stores the reconstructed PET image in the memory 130.

The system control function 106c controls the entire PET apparatus 100 by controlling the gantry 10 and the console 20. For example, the system control function 106c controls image capturing performed by the PET apparatus 100. Further, the system control function 106c controls movement of the tabletop 103 by controlling the table driving unit 105.

Furthermore, the system control function 106c causes the display 120 to display various kinds of images and various kinds of information. For example, the system control function 106c causes the display 120 to display the PET image. Furthermore, the system control function 106c causes the display 120 to display a Graphical User Interface (GUI) for receiving various kinds of instructions and various kinds of setting from a user (operator) of the PET apparatus 100.

The identification function 106d identifies predetermined coincidence counting information from the coincidence counting information stored in the memory 130. Meanwhile, a process performed by the identification function 106d will be described later.

The generation function 106e generates a TOF drawn image based on the TOF information that is included in the predetermined coincidence counting information identified by the identification function 106d. Meanwhile, a process performed by the generation function 106e will be described later.

The estimation function 106f estimates a time lag amount between the detector modules based on the TOF information and the reconstructed image. Meanwhile, a process performed by the estimation function 106f will be described later.

The calibration function 106g calibrates time information in the detection module based on the time lag amount estimated by the estimation function 106f. Meanwhile, a process performed by the calibration function 106g will be described later.

The input interface 110 receives input of various kinds of instructions and various kinds of setting from a user, and outputs the received various kinds of instructions and the received various kinds of setting to the processing circuitry 106. For example, the input interface 110 converts input operation received from the user to an electrical signal, and transmits the electrical signal to the processing circuitry 106. For example, the input interface 110 is implemented by a trackball, a switch button, a mouse, a keyboard, a touchpad that performs input operation upon touching of the operation surface, a touch screen in which a display screen and a touchpad are integrated, contactless input circuitry using an optical sensor, voice input circuitry, and the like. Meanwhile, in the present specification, the input interface 110 is not limited to those including a physical operating part, such as a mouse or a keyboard. For example, examples of the input interface 110 include electrical signal processing circuitry that receives an electrical signal corresponding to input operation from an external input device that is arranged separately from the PET apparatus 100 and transmits the electrical signal to the processing circuitry 106.

The display 120 is connected to the processing circuitry 106 and displays various kinds of information and various kinds of images. For example, the display 120 converts information and data that are transmitted from the processing circuitry 106 to electrical signals for display and output the electrical signals. As a specific example, the display 120 displays the PET image or a GUI for receiving various kinds of instructions and various kinds of setting from a user under the control of the system control function 106c. For example, the display 120 is implemented by a liquid crystal monitor, a Cathode Ray Tube (CRT) monitor, a touch panel, or the like.

The memory 130 stores therein various kinds of data that are used in the PET apparatus 100. The memory 130 is implemented by, for example, a semiconductor memory device, such as a Random Access Memory (RAM) or a flash memory, a hard disk, an optical disk, or the like. The memory 130 stores therein the counting information, the chronological list of the coincidence counting information, the reconstructed PET image, or the like.

Thus, the example of the configuration of the PET apparatus 100 according to the present embodiment has been described above. For example, the PET apparatus 100 is installed in a medical institution, such as a hospital or a clinic, and is used for various kinds of image diagnosis using the PET image that is generated by the PET apparatus 100 while adopting a patient or the like who is hospitalized or who goes to the medical institution as the subject P. Here, the PET apparatus 100 according to the present embodiment makes it possible to easily perform the TOF calibration.

As described above, in the TOF-PET apparatus, it is needed to periodically perform time calibration (TOF calibration) on the detector to accurately perform reconstruction using the TOF information. However, in general TOF calibration, a serviceman identifies a detection time lag in a detector by using an external radiation source and adjusts time information on the corresponding detector based on the identified lag, which takes time and effort. To cope with this, the PET apparatus 100 according to the present embodiment estimates the time lag amount of the detector by using the TOF information and the reconstructed image, so that it is possible to reduce time and effort for the TOF calibration and easily perform the TOF calibration. Further, the PET apparatus 100 according to the present embodiment is able to reduce radiation exposure of the serviceman by using the list mode data that is collected from the subject P without using the list mode data that is collected by using the external radiation source as a target. Details of a process performed by the PET apparatus 100 will be described below.

The identification function 106d identifies first coincidence data that is obtained by coincidence counting by a first detector and a second detector that is different from the first detector from among a plurality of pieces of coincidence data included in the list mode data. Specifically, the identification function 106d identifies TOF information that is used for estimation of the time lag amount. That is, the identification function 106d identifies a detector module to be subjected to the TOF calibration.

For example, the identification function 106d identifies the TOF information that is used for estimation of the time lag amount from among the pieces of coincidence data illustrated in FIG. 2B. As one example, the identification function 106d identifies the TOF information with a "coincidence No. 1" as the TOF information that is used for estimation of the time lag amount. Accordingly, a detector module D1 corresponding to a "scintillator number (P): P11" and a detector module D2 corresponding to a "scintillator number (P): P22" are subjected to the TOF calibration.

Meanwhile, the identification function 106d may identify the TOF information on all pieces of the coincidence data, or may identify the TOF information on a predetermined piece of coincidence data (that is, coincidence data corresponding to a predetermined detector module).

The generation function 106e generates a TOF drawn image in which a pair annihilation point position is estimated based on the TOF information. Specifically, the generation function 106e generates a TOF drawn image in which the position of the pair annihilation point is drawn by using the TOF information on the coincidence data that is identified by the identification function 106d.

Figure 3:
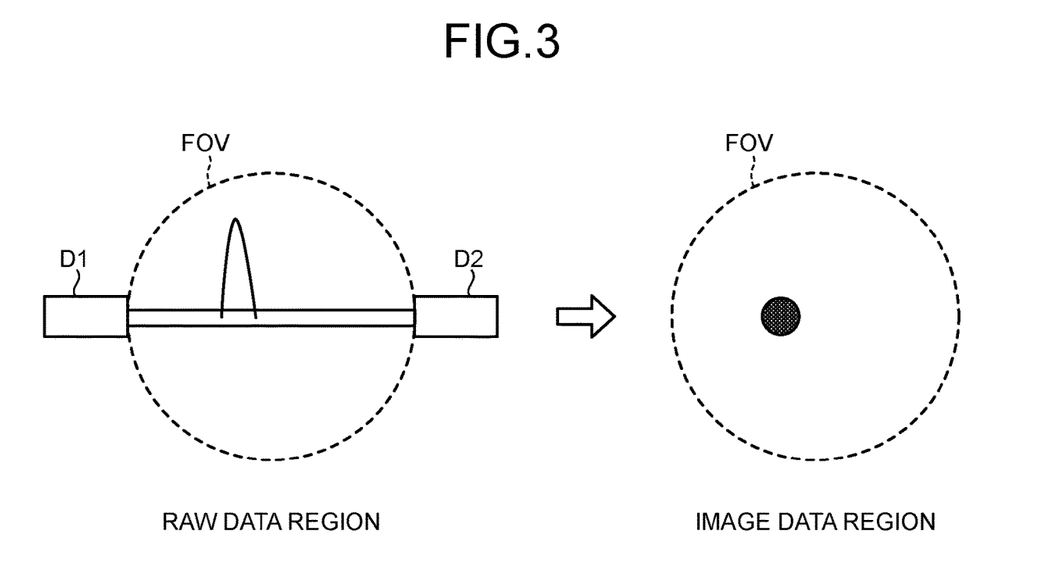
FIG. 3 is a diagram for explaining a TOF drawn image according to the first embodiment.

FIG. 3 is a diagram for explaining the TOF drawn image according to the first embodiment. Here, FIG. 3 illustrates an example in which the TOF drawn image corresponding to the TOF information with the "coincidence No. 1" is generated, but, in reality, the generation function 106e generates the TOF drawn images based on the TOF information on all pieces of the coincidence data identified by the identification function 106d. Further, FIG. 3 illustrates a two-dimensional image for convenience of explanation, but, in reality, the generation function 106e generates a three-dimensional TOF drawn image.

In the TOF-PET apparatus, as illustrated in the diagram of a raw data region on the left side in FIG. 3, a coordinate point of the pair annihilation point is estimated from a difference in the detection time (T) between the detector modules, and a distribution with a half width of a distance corresponding to time resolution of the TOF along Line-of-Response (LOR) is adopted as the pair annihilation point location information. As illustrated in the diagram of an image data region on the right side in FIG. 3, the generation function 106e generates the TOF drawn image in which a point corresponding to the pair annihilation point location information as described above is indicated on three-dimensional coordinates.

Here, the TOF drawn image generated by the generation function 106e is formed by drawing a coincidence event as a point instead of being reconstructed, and therefore, a position of the point sensitively responds to the time information in the detector module. That is, the position of the point in the TOF drawn image is information that strictly reflects the detection time (T) in each of the detector modules. Meanwhile, the point in the TOF drawn image is located at a more accurate position with an increase in the time resolution of the TOF.

The estimation function 106f estimates the time lag amount between the first detector and the second detector based on the TOF information included in the first coincidence data and the reconstructed image. Specifically, the estimation function 106f estimates the time lag amount based on the TOF drawn image and the reconstructed image. More specifically, the estimation function 106f estimates the time lag amount based on a result of comparison between the TOF drawn image and the reconstructed image by overlapping the images with one another.

Figure 4:
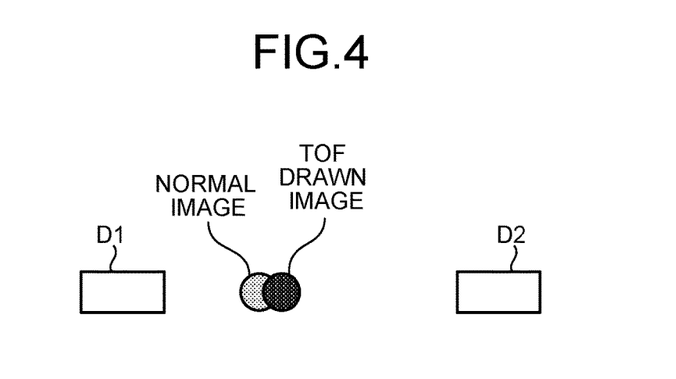
FIG. 4 is a diagram for explaining a process of estimating a time lag amount according to the first embodiment.

FIG. 4 is a diagram for explaining a process of estimating the time lag amount according to the first embodiment. Here, FIG. 4 illustrates a positional relationship between corresponding pair annihilation points when the TOF drawn image and the PET image (a normal image in the drawing) illustrated in FIG. 3 overlap with each other. For example, the estimation function 106f estimates the time lag amount between the detector module D1 and the detector module D2 from positional deviation between the pair annihilation point in the normal image and the pair annihilation point in the TOF drawn image illustrated in FIG. 4.

As described above, the TOF drawn image is formed by drawing the coincidence event as a point without being reconstructed, and therefore, the position reflects the detection time (T) of each of the detector modules. In contrast, the PET image is reconstructed based on pieces of coincidence data that are collected at various angles, and therefore the position of the pair annihilation point is relatively close to a true value. Therefore, by comparing the TOF drawn image with the PET image and detecting time lag, it is possible to detect a time lag that has occurred in the detection time (T) of each of the detector modules.

Here, the PET image to be compared with the TOF drawn image may be generated by reconstruction using the TOF information, or may be generated by Non-TOF reconstruction without using the TOF information. That is, the reconstruction function 106b reconstructs the PET image without using each piece of the TOF information on the plurality of pieces of coincidence data included in the list mode data, and the estimation function 106f estimates the time lag amount by using the PET image.

The PET image that is generated by the Non-TOF reconstruction is reconstructed without using the TOF information, and therefore, is not affected by a time lag included in the TOF information and is closer to the true value as compared to the PET image that is generated by reconstruction using the TOF information. That is, with use of the PET image that is generated by the Non-TOF reconstruction, it is possible to more accurately estimate the time lag amount.

For example, in the example illustrated in FIG. 4, a point of the TOF drawn image is deviated toward the detector module side with respect to the normal image, and therefore, the estimation function 106f determines that a time lag has occurred between the detector module D1 and the detector module D2. Further, the estimation function 106f estimates the time lag amount from the amount of point deviation.

Here, the priority is given to each of the detector modules, and the detector module that serves as a reference is determined. For example, in the state as illustrated in FIG. 4, if higher priority is given to the detector module D1 than the detector module D2, the estimation function 106f determines that the time of the detector module D2 has deviated to the early side. That is, the estimation function 106f estimates that the time of the detector module D2 is faster by a certain time corresponding to image shift with respect to the detector module D1.

As described above, the estimation function 106f estimates the time lag amount of the detector module by comparing the TOF drawn image and the PET image. Here, the estimation function 106f is able to set an arbitrary region as a comparison target when comparing the images.

For example, the estimation function 106f calculates a first center-of-gravity position that indicates the center of gravity of image information in the entire TOF drawn image and a second center-of-gravity position that indicates a position of the center of gravity of image information in the entire reconstructed image (PET image), and estimates the time lag amount based on the first center-of-gravity position and the second center-of-gravity position. That is, the estimation function 106f estimates the time lag amount simply based on the amount of deviation between the centers of gravity of the entire images. Here, the estimation function 106f identifies the detector module for which the time information has deviated based on a direction in which the center of gravity deviates.

In this manner, by estimating the time lag amount by using the center of gravity of the entire image, it is possible to identify the detector module for which the time information has deviated from among all of the detector modules and estimate the time lag amount of the identified detector module, so that it is possible to perform the TOF calibration on the entire PET detector 101.

Further, for example, the estimation function 106f extracts a first region that indicates a relatively high count in the TOF drawn image and a second region that indicates a relatively high count in the reconstructed image (PET image), and estimates the time lag amount based on the first region and the second region. That is, the estimation function 106*f* compares regions (HOT portions) in which the pair annihilation points are concentrated, and estimates the time lag amount from the amount of deviation between the HOT portions. Here, the estimation function 106*f* identifies the detector module for which the time information has deviated based on a direction in which the HOT portion deviates.

In this manner, by estimating the time lag amount by using the HOT portions in the images, it is possible to limit the detector module to be subjected to calibration and perform the TOF calibration on the limited detector module with high accuracy.

The calibration function 106*g* calibrates the time information on the first detector or the second detector based on the time lag amount. Specifically, the calibration function 106*g* calibrates the time information on a target detector module based on the time lag amount that is estimated by the estimation function 106*f*. For example, in the state as illustrated in FIG. 4, the calibration function 106*g* adjusts the time information with respect to the counting information generation circuit 102 corresponding to the detector module D2, based on an estimation result indicating that "the time of the detector module D2 is faster by a certain time corresponding to image shift with respect to the detector module D1", which is obtained by the estimation function 106*f*.

In this manner, the calibration function 106*g* adjusts a time corresponding to the time lag amount that is estimated by the estimation function 106*f*, with respect to the counting information generation circuit 102 corresponding to the detector module for which the estimation function 106*f* has determined that the time information has deviated. Here, it may be possible to set an upper limit of the time lag amount to be subjected to calibration by the calibration function 106*g*. That is, the calibration function 106*g* calibrates the time information on the first detector or the second detector on condition that the time lag amount falls within a threshold.

For example, it may be possible to set an upper limit of the time resolution of TOF in the PET detector 101 to 1%, and if the threshold is exceeded, it may be possible to cause the calibration function 106*g* not to perform the TOF calibration. In this case, the system control function 106*c* causes the display 120 to display information indicating that the time lag amount exceeds the upper limit, and notifies a user that the PET apparatus 100 has not performed the TOF calibration. The user who checks the display requests a serviceman to perform the TOF calibration, for example.

As described above, the PET apparatus 100 performs the TOF calibration by using the list mode data. Here, the PET apparatus 100 performs the TOF calibration at an arbitrary timing. For example, the PET apparatus 100 may perform the TOF calibration every time the list mode data is collected, or may perform the TOF calibration by using the list mode data that is collected before a certain set time (for example, night time).

Figure 5:
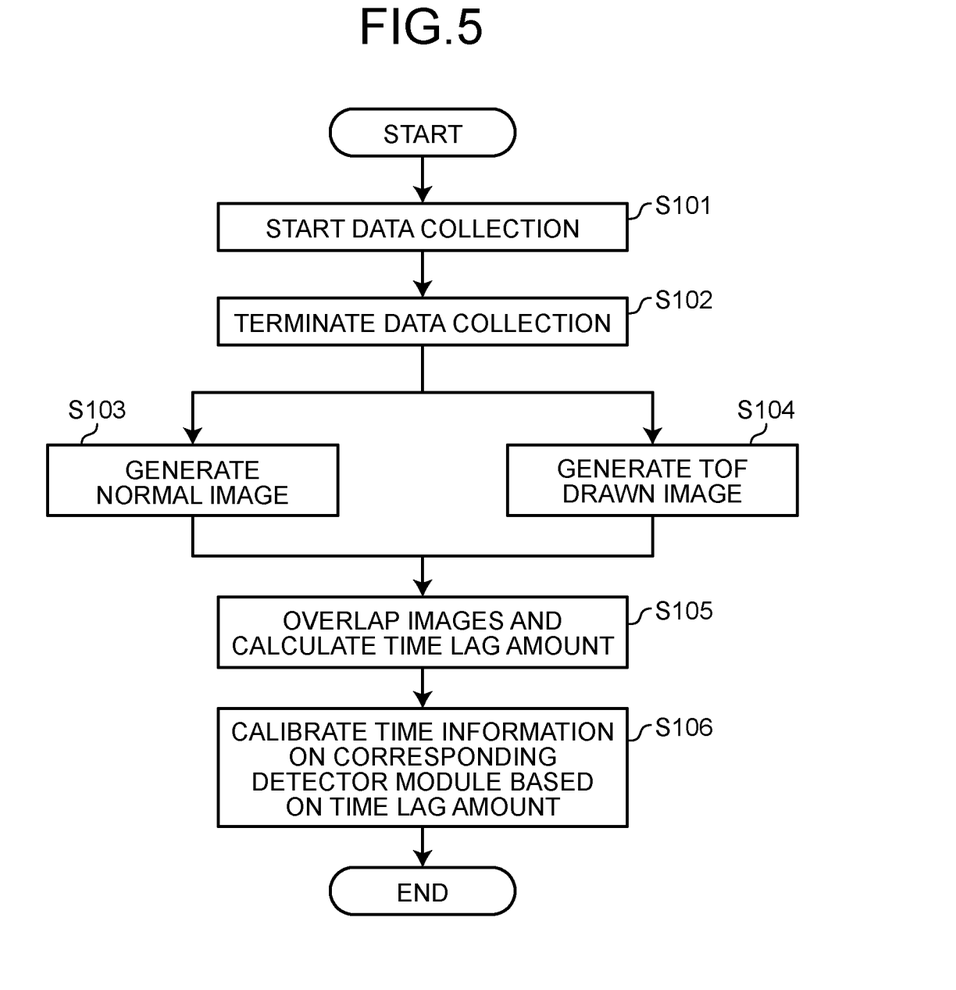
FIG. 5 is a flowchart illustrating the flow of a process performed by the PET apparatus according to the first embodiment.

An example of the process performed by the PET apparatus 100 will be described below with reference to FIG. 5. FIG. 5 is a flowchart illustrating the flow of the process performed by the PET apparatus 100 according to the first embodiment.

For example, as illustrated in FIG. 5, in the present embodiment, the system control function 106*c* and the coincidence counting information generation function 106*a* start data collection (Step S101) and terminate the data collection (Step S102). This process is implemented by, for example, causing the processing circuitry 106 to read programs corresponding to the system control function 106*c* and the coincidence counting information generation function 106*a* from the memory 130 and execute the programs.

Subsequently, the reconstruction function 106*b* generates the normal image by using the collected coincidence data (Step S103). This process is implemented by, for example, causing the processing circuitry 106 to read a program corresponding to the reconstruction function 106*b* from the memory 130 and execute the program.

Further, the identification function 106*d* identifies the coincidence data, and the generation function 106*e* generates the TOF drawn image based on the TOF information in the identified coincidence data (Step S104). This process is implemented by, for example, causing the processing circuitry 106 to read programs corresponding to the identification function 106*d* and the generation function 106*e* from the memory 130 and execute the programs.

Subsequently, the estimation function 106*f* calculates the time lag amount by overlapping the normal image and the TOF drawn image (Step S105). This process is implemented by, for example, causing the processing circuitry 106 to read a program corresponding to the estimation function 106*f* from the memory 130 and execute the program.

Then, the calibration function 106*g* calibrates the time information on the corresponding detector module based on the time lag amount (Step S106). This process is implemented by, for example, causing the processing circuitry 106 to read a program corresponding to the calibration function 106*g* from the memory 130 and execute the program.

Meanwhile, in the flowchart illustrated in FIG. 5, the example is illustrated in which the TOF drawn image is generated after the data collection is completed, but it may be possible to generate the TOF drawn image during the data collection.

As described above, according to the first embodiment, the counting information generation circuit 102 acquires the list mode data. The reconstruction function 106*b* reconstructs the PET image based on the list mode data. The identification function 106*d* identifies the first coincidence data that is obtained by coincidence counting by the first detector and the second detector that is different from the first detector from among a plurality of pieces of coincidence data included in the list mode data. The estimation function 106*f* estimates the time lag amount between the first detector and the second detector based on the TOF information included in the first coincidence data and the reconstructed image. Therefore, the PET apparatus 100 according to the first embodiment is able to perform the TOF calibration by using the collected data, so that it is possible to simply and easily perform the TOF calibration. Furthermore, according to the first embodiment, it is possible to perform TOF reconstruction without using the external radiation source, so that it is possible to reduce radiation exposure on a serviceman.

Moreover, according to the first embodiment, the calibration function 106*g* calibrates the time information on the first detector or the second detector based on the time lag amount. Therefore, the PET apparatus 100 according to the first embodiment is able to automatically perform the TOF calibration, so that it is possible to simply and easily perform the TOF calibration.

Furthermore, according to the first embodiment, the generation function 106*e* generates the TOF drawn image in which the pair annihilation point position is estimated based on the TOF information. The estimation function 106*f* estimates the time lag amount based on the TOF drawn image and the reconstructed image. Therefore, the PET apparatus 100 according to the first embodiment is able to estimate the time lag amount of the detector module by comparing images, so that it is possible to simply and easily perform the TOF calibration.

Moreover, according to the first embodiment, the estimation function 106*f* calculates the first center-of-gravity position that indicates the center of gravity of the image information in the entire TOF drawn image and the second center-of-gravity position that indicates the position of the center of gravity in the image information in the entire reconstructed image, and estimates the time lag amount based on the first center-of-gravity position and the second center-of-gravity position. Therefore, the PET apparatus 100 according to the first embodiment is able to perform the TOF calibration on the entire PET detector 101.

Furthermore, according to the first embodiment, the estimation function 106*f* extracts the first region that indicates a relatively high count in the TOF drawn image and the second region that indicates a relatively high count in the reconstructed image, and estimates the time lag amount based on the first region and the second region. Therefore, the PET apparatus 100 according to the first embodiment is able to perform the TOF calibration on the limited detector module with high accuracy.

Moreover, according to the first embodiment, the reconstruction function 106*b* reconstructs the PET image without using the TOF information on each piece of the coincidence data included in the list mode data. Therefore, the PET apparatus 100 according to the first embodiment is able to estimate the time lag amount with high accuracy.

Furthermore, according to the first embodiment, the calibration function 106*g* calibrates the time information on the first detector or the second detector on condition that the time lag amount falls within the threshold. Therefore, the PET apparatus 100 according to the first embodiment is able to perform the TOF calibration within a desired range.

First Modification

In the embodiment as described above, the example has been described in which all pairs of the detector modules are adopted as targets. However, embodiments are not limited to this example, and it may be possible to limit a pair of the detector modules, for example.

Specifically, the identification function 106*d* according to a first modification limits a predetermined detector to at least one of the first detector and the second detector, and identifies the first coincidence data that is obtained by coincidence counting by the first detector and the second detector.

Figure 6:
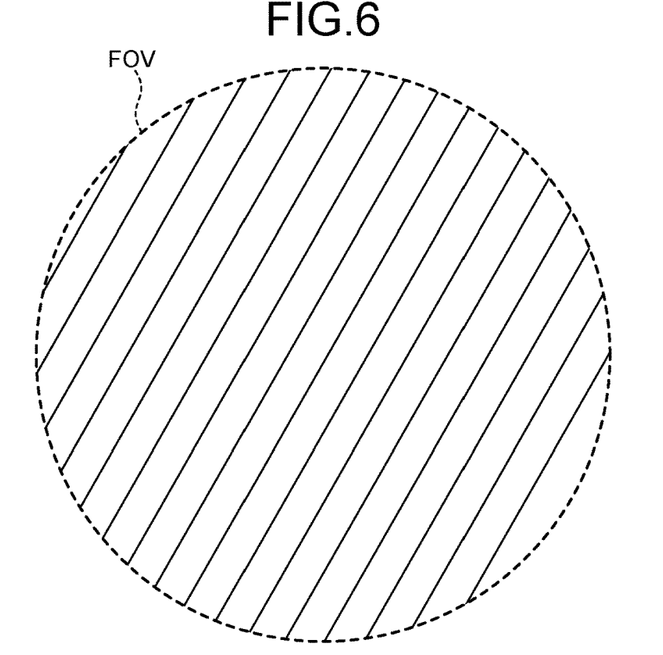
FIG. 6 is a diagram for explaining an example of a pair of detector modules according to a first modification.
Figure 7:
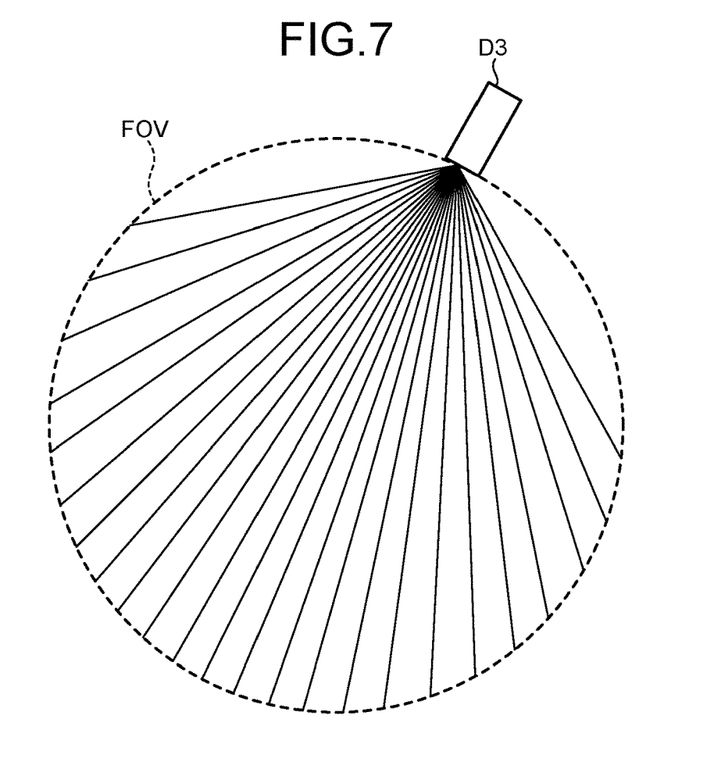
FIG. 7 is a diagram for explaining an example of the pair of detector modules according to the first modification.

FIG. 6 and FIG. 7 are diagrams for explaining an example of a pair of detector modules according to the first modification. For example, as illustrated in FIG. 6, the identification function 106*d* limits a calibration angle in the FOV to a 60° direction, and identifies coincidence data that is detected by detector modules that form a pair in the limited direction as coincidence data that is used for the TOF calibration.

Furthermore, as illustrated in FIG. 7 for example, the identification function 106*d* limits a detector module to a detector module D3, and identifies coincidence data that is detected by a detector module that forms a pair with the limited detector module D3 as coincidence data that is used for the TOF calibration.

As described in the first embodiment, if all pairs of the detector modules are adopted as targets, calculation becomes complicated and does not converge in some cases. Therefore, by limiting the pair of the detector modules as described above, calculation related to the TOF calibration is simplified, so that it is possible to reliably cause the calculation related to the TOF calibration to converge.

Second Modification

In the embodiment as described above, the example has been described in which the PET image and the TOF drawn image overlap with each other and the time lag amount is estimated from positional deviation. However, embodiments are not limited to this example, and, for example, it may be possible to estimate the time lag amount by using a trained model. Specifically, the estimation function 106*f* according to a second modification estimates the time lag amount by using a trained model that is trained so as to output the time lag amount in accordance with input of the TOF information and the reconstructed image.

Figure 8A:
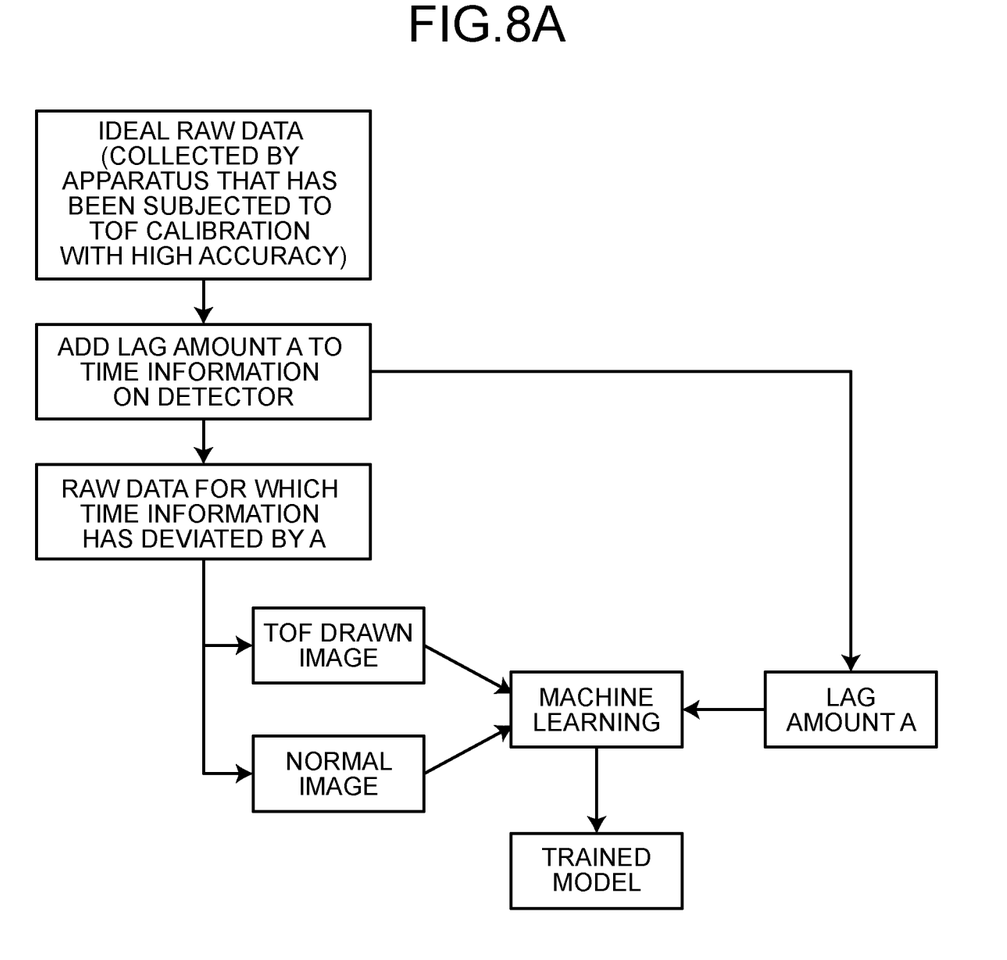
FIG. 8A is a diagram for explaining an example of construction of a trained model according to a second modification.

FIG. 8A is a diagram for explaining an example of construction of a trained model according to the second modification. Here, the trained model illustrated in FIG. 8A is constructed by an information processing apparatus, such as a workstation, by using data that is collected by the PET apparatus. Then, the constructed trained model is stored in the memory 130 of the PET apparatus 100.

For example, the trained model according to the second modification is constructed by, as illustrated in FIG. 8A, performing machine learning by using a plurality of sets, where each set is set data (training data) of the TOF drawn image, the normal image (PET image), and a lag amount. Here, the training data used to construct the trained model as described above is generated based on ideal raw data as illustrated in FIG. 8A.

The ideal raw data is list mode data in which the TOF information has not deviated (the time information on the detector module has not deviated), and is collected by the PET apparatus that has been subjected to the TOF calibration with high accuracy, for example. Here, the PET apparatus that is subjected to the TOF calibration with high accuracy is, for example, a PET apparatus that is just subjected to the TOF calibration by a serviceman.

Further, a lag amount A is added to the time information on the detector of the ideal raw data, and a known time lag amount is given to the time information on the detector. With this configuration, raw data for which the time information has deviated by A is acquired. Then, the TOF drawn image and the normal image are generated by using the acquired raw data, and serve as the training data together with the time lag amount A. In the construction of the trained model according to the second modification, the lag amount A as described above is changed in various manners and a plurality of pieces of training data are generated.

Further, by performing machine learning by using a plurality of pieces of training data that includes the TOF drawn image and the normal image, which are generated by using the raw data for which the time information has deviated by A, and the known time lag amount A, the trained model is constructed.

Figure 8B:
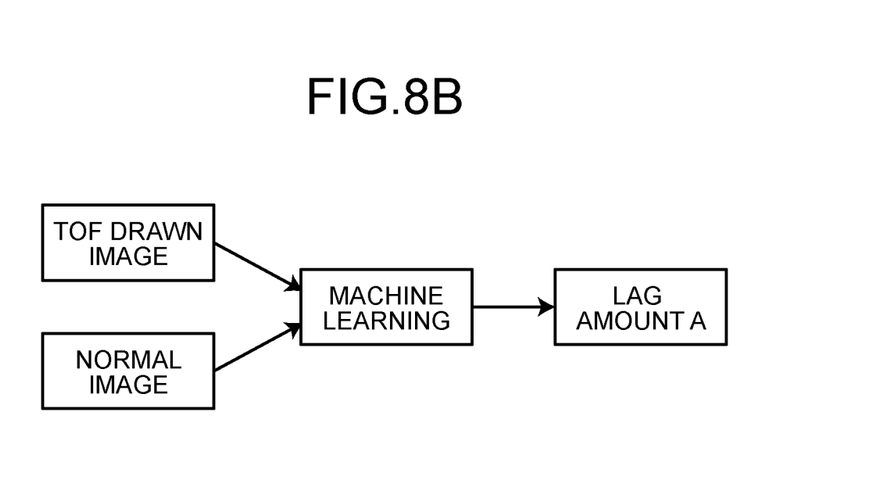
FIG. 8B is a diagram illustrating an example of the trained model according to the second modification.

For example, as illustrated in FIG. 8B, the estimation function 106*f* reads the above-described trained model that is stored in the memory 130, inputs the TOF drawn image and the normal image that are based on the list mode data that is newly collected with respect to the read trained model, and acquires the time lag amount. Meanwhile, FIG. 8B is a diagram illustrating an example of the trained model according to the second modification.

As described above, the estimation function 106*f* estimates the time lag amount by using the trained model. Therefore, the PET apparatus 100 according to the second modification is able to easily estimate the time lag amount.

Third Modification

In the embodiment as described above, the example has been described in which the TOF drawn image is generated from the TOF information, and the time lag amount is estimated by using the generated TOF drawn image. However, embodiments are not limited to this example, and it may be possible to estimate the time lag amount by using the TOF information without generating the TOF drawn image.

In this case, the estimation function 106f according to a third modification identifies location information from the TOF information, and estimates the time lag amount by comparing the identified location information and the PET image. That is, the estimation function 106f identifies a position on the PET image indicated by the location information based on the TOF information (the position of the pair annihilation point corresponding to the TOF information), and estimates the time lag amount from the identified position and the position of the pair annihilation point in the PET image.

With this configuration, the PET apparatus 100 according to the third modification is able to omit a process related to generation of the TOF drawn image, so that it is possible to reduce a processing load related to the TOF calibration. Meanwhile, when the trained model that estimates the time lag amount by using the TOF information is to be constructed, the TOF information is used instead of the TOF drawn image in the construction of the trained model illustrated in FIG. 8A.

Fourth Modification

In the embodiment as described above, the example has been described in which the TOF calibration is performed by using the list mode data that is collected for the subject P. However, embodiments are not limited to this example, and it may be possible to perform the TOF calibration according to the present application by using list mode data that is collected for an external radiation source, for example.

The term "processor" used in the description above indicates, for example, circuitry, such as a Central Processing Unit (CPU), a Graphical Processing Unit (GPU), an Application Specific Integrated Circuit (ASIC), or a programmable logic device (for example, a Simple Programmable Logic Device (SPLD), a Complex Programmable Logic Device (CPLD), or a Field Programmable Gate Array (FPGA)). The processor implements functions by reading programs stored in the memory 130 and executing the read programs.

A program that is executed by the processor is provided by being incorporated in a Read Only Memory (ROM), memory circuitry, or the like in advance. Meanwhile, the program may be provided by being recorded in a non-transitory computer readable storage medium, such as a Compact Disc (CD)-ROM, a Flexible Disk (FD), a CD-recordable (R), or a Digital Versatile Disk (DVD), in a computer installable or executable file format. Further, the program may be stored in a computer that is connected to a network, such as the Internet, and may be provided or distributed by download via a network. For example, the program include modules including each of processing functions as described above. As actual hardware, a CPU reads a program from a storage medium, such as a ROM, and executes the program, so that each of the modules is loaded on a main storage device and generated on the main storage device.

According to at least one embodiment as described above, it is possible to easily perform the TOF calibration.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A PET apparatus comprising:
processing circuitry configured to:
  acquire list mode data;
  reconstruct a PET image based on the list mode data;
  identify first coincidence data that is obtained by coincidence counting by a first detector and a second detector that is different from the first detector from among a plurality of pieces of coincidence data included in the list mode data; and
  estimate a time lag amount indicating a difference between a reaction time of the first detector to an incident gamma ray and a reaction time of the second detector to an incident gamma ray based on TOF information included in the first coincidence data and the PET image,
wherein the processing circuitry is further configured to:
  generate a TOF drawn image in which a pair annihilation point position is estimated based on the TOF information,
  calculate a first center-of-gravity position that indicates a center of gravity of the image information in the entire TOF drawn image and a second center-of-gravity position that indicates a position of the center of gravity of image information on the entire PET image, and
  estimate the time lag amount using a position lag amount between the first center-of-gravity position and the second center-of-gravity position and a positional relationship between the first detector and the second detector.

2. The PET apparatus according to claim 1, wherein the processing circuitry is configured to calibrate time information on one of the first detector and the second detector based on the time lag amount.

3. The PET apparatus according to claim 2, wherein the processing circuitry is configured to calibrate time information on one of the first detector and the second detector on condition that the time lag amount is equal to or smaller than a threshold.

4. The PET apparatus according to claim 1, wherein the processing circuitry is configured to reconstruct the PET image without using TOF information on each pieces of the coincidence data included in the list mode data.

5. The PET apparatus according to claim 1, wherein the processing circuitry is configured to
  limit a predetermined detector to at least one of the first detector and the second detector, and
  identify first coincidence data that is obtained by coincidence counting by the first detector and the second detector.

6. The PET apparatus according to claim 1, wherein the processing circuitry is configured to estimate the time lag amount by using a trained model that is trained so as to output a time lag amount in accordance with input of the TOF information and the reconstructed image.

7. A method comprising:
acquiring list mode data;
reconstructing a PET image based on the list mode data;
identifying first coincidence data that is obtained by coincidence counting by a first detector and a second detector that is different from the first detector from among a plurality of pieces of coincidence data included in the list mode data; and
estimating a time lag amount indicating a difference between a reaction time of the first detector to an incident gamma ray and a reaction time of the second detector to an incident gamma ray based on TOF information included in the first coincidence data and the PET image,
wherein the method further comprises:
generating a TOF drawn image in which a pair annihilation point position is estimated based on the TOF information;
calculating a first center-of-gravity position that indicates a center of gravity of the image information in the entire TOF drawn image and a second center-of-gravity position that indicates a position of the center of gravity of image information on the entire PET image; and
estimating the time lag amount using a position lag amount between the first center-of-gravity position and the second center-of-gravity position and a positional relationship between the first detector and the second detector.

8. A non-transitory computer readable storage medium on which an executable program is recorded, the program instructing a processor to execute a process comprising:
acquiring list mode data;
reconstructing a PET image based on the list mode data;
identifying first coincidence data that is obtained by coincidence counting by a first detector and a second detector that is different from the first detector from among a plurality of pieces of coincidence data included in the list mode data; and
estimating a time lag amount indicating a difference between a reaction time of the first detector to an incident gamma ray and a reaction time of the second detector to an incident gamma ray based on TOF information included in the first coincidence data and the PET image,
wherein the process further comprises:
generating a TOF drawn image in which a pair annihilation point position is estimated based on the TOF information;
calculating a first center-of-gravity position that indicates a center of gravity of the image information in the entire TOF drawn image and a second center-of-gravity position that indicates a position of the center of gravity of image information on the entire PET image; and
estimating the time lag amount using a position lag amount between the first center-of-gravity position and the second center-of-gravity position and a positional relationship between the first detector and the second detector.

9. A PET apparatus comprising:
processing circuitry configured to:
acquire list mode data;
reconstruct a PET image based on the list mode data;
identify first coincidence data that is obtained by coincidence counting by a first detector and a second detector that is different from the first detector from among a plurality of pieces of coincidence data included in the list mode data; and
estimate a time lag amount indicating a difference between a reaction time of the first detector to an incident gamma ray and a reaction time of the second detector to an incident gamma ray based on TOF information included in the first coincidence data and the PET image,
wherein the processing circuitry is further configured to:
generate a TOF drawn image in which a pair annihilation point position is estimated based on the TOF information;
extract a first region that indicates a relatively high count in the TOF drawn image and a second region that indicates a relatively high count in the PET image; and
estimate the time lag amount using a position lag amount between the first region and the second region and a positional relationship between the first detector and the second detector.

10. The PET apparatus according to claim 9, wherein the processing circuitry is configured to calibrate time information on one of the first detector and the second detector based on the time lag amount.

11. The PET apparatus according to claim 10, wherein the processing circuitry is configured to calibrate time information on one of the first detector and the second detector on condition that the time lag amount is equal to or smaller than a threshold.

12. The PET apparatus according to claim 9, wherein the processing circuitry is configured to reconstruct the PET image without using TOF information on each pieces of the coincidence data included in the list mode data.

13. The PET apparatus according to claim 9, wherein the processing circuitry is configured to
limit a predetermined detector to at least one of the first detector and the second detector, and
identify first coincidence data that is obtained by coincidence counting by the first detector and the second detector.

14. The PET apparatus according to claim 9, wherein the processing circuitry is configured to estimate the time lag amount by using a trained model that is trained so as to output a time lag amount in accordance with input of the TOF information and the reconstructed image.

15. A method comprising:
acquiring list mode data;
reconstructing a PET image based on the list mode data;
identifying first coincidence data that is obtained by coincidence counting by a first detector and a second detector that is different from the first detector from among a plurality of pieces of coincidence data included in the list mode data; and
estimating a time lag amount indicating a difference between a reaction time of the first detector to an incident gamma ray and a reaction time of the second detector to an incident gamma ray based on TOF information included in the first coincidence data and the PET image,
wherein the method further comprises:
generating a TOF drawn image in which a pair annihilation point position is estimated based on the TOF information;
extracting a first region that indicates a relatively high count in the TOF drawn image and a second region that indicates a relatively high count in the PET image; and
estimating the time lag amount using a position lag amount between the first region and the second region and a positional relationship between the first detector and the second detector.

16. A non-transitory computer readable storage medium on which an executable program is recorded, the program instructing a processor to execute a process comprising:
acquiring list mode data;
reconstructing a PET image based on the list mode data;

identifying first coincidence data that is obtained by coincidence counting by a first detector and a second detector that is different from the first detector from among a plurality of pieces of coincidence data included in the list mode data; and estimating a time lag amount indicating a difference between a reaction time of the first detector to an incident gamma ray and a reaction time of the second detector to an incident gamma ray based on TOF information included in the first coincidence data and the PET image, wherein the process further comprises:
- generating a TOF drawn image in which a pair annihilation point position is estimated based on the TOF information;
- extracting a first region that indicates a relatively high count in the TOF drawn image and a second region that indicates a relatively high count in the PET image; and
- estimating the time lag amount using a position lag amount between the first region and the second region and a positional relationship between the first detector and the second detector.

* * * * *